United States Patent [19]

Mitsuda et al.

[11] Patent Number: 4,981,763
[45] Date of Patent: Jan. 1, 1991

[54] ELECTROCHEMICAL SINGLE BATTERY AND METHOD FOR PRODUCING THE SAME

[75] Inventors: Kenro Mitsuda; Toshiaki Murahashi, both of Amagasaki; Yoshiaki Sakamoto; Tatsuo Mitsunaga, both of Kobe, all of Japan

[73] Assignee: Mitsubishi Denki Kabushiki Kaisha, Tokyo, Japan

[21] Appl. No.: 438,011

[22] Filed: Nov. 20, 1989

[30] Foreign Application Priority Data

Dec. 14, 1988 [JP] Japan .................. 63-316913

[51] Int. Cl.⁵ .............................. H01M 8/12
[52] U.S. Cl. ...................... 429/41; 429/30; 29/623.3
[58] Field of Search ............. 429/16, 30, 32, 33, 429/41; 29/623.3, 623.1

[56] References Cited

U.S. PATENT DOCUMENTS 4,761,352  8/1988  Bakos et al. ............. 429/136
4,781,727 11/1988  Mitsuda et al. ........... 29/623.2
4,799,936  1/1989  Riley ..................... 429/30

FOREIGN PATENT DOCUMENTS 59-217955 12/1984 Japan .
60-100378  6/1985 Japan .
64-48374   2/1989 Japan .

Primary Examiner—Donald L. Walton
Attorney, Agent, or Firm—Oblon, Spivak, McClelland, Maier & Neustadt

[57] ABSTRACT

An electrochemical single battery such as fuel cells, and so forth, having an increased reaction area to augment its output density, which comprises a pair of electrode parts which are mutually opposed to be the electrodes when the electrochemical reaction is effected; reaction layers to carry out the electrochemical reaction, which are positioned between these two electrode parts, each being protruded alternately in one and the same direction from one electrode part toward the other electrode part in confrontation thereto, and being a slant with respect to said electrode parts; and an electrolyte layer interposed between these confronted reaction layers and holding therein an electrolyte which transmits ions to be produced at the time of the electrochemical reaction.

A method for producing an electrochemical single battery, which comprises steps of: forming, on both surfaces of a planar electrolyte layer sheet, reaction layer sheets of a size smaller than the electrolyte layer sheet in lamination, followed by shaping the laminated sheets into the form of bellows; and pressing the laminated sheets in the form of bellows from a slant direction with respect to the sheet surface.

3 Claims, 5 Drawing Sheets

ELECTROCHEMICAL SINGLE BATTERY AND METHOD FOR PRODUCING THE SAME

BACKGROUND OF THE INVENTION

1. Field of the Invention

The invention relates to an electrochemical single battery such as fuel cells, and so forth, and, more particularly, it is concerned with such electrochemical single battery having an increased reaction area so as to augment its output density, and a method for producing such electrochemical single battery.

2. Discussion of Background

In the following, explanations will be given on the electrochemical single battery, taking a fuel cell as an example.

As has already been well known, the fuel cell is a kind of electric generating device, from which electric energy is taken out. The construction of this fuel cell is such that an electrolyte layer holding therein an electrolyte is interposed between a fuel electrode and an oxidizer electrode, both being arranged in a mutually opposed relationship, and a fuel and an oxidizer are fed into the fuel electrode and the oxidizer electrode, respectively, to thereby take out the electric energy therefrom.

Depending on the kind of the electrolyte used, the fuel cell is classified into various types such as an alkali type, a phosphoric acid type, a high molecular weight solid electrolyte type, a molten carbonate type, a solid electrolyte type, and others.

Hereinbelow, explanations will be given on the phosphoric acid type fuel cell as an example. The most common structure of the phosphoric acid type fuel cells is the so-called "rib-separator type", the typical cell structure of which is described in U.S. Pat. No. 3,867,206 (Japanese Patent Publication No. 152/1983) and U.S. Pat. No. 4,276,355 (Japanese Unexamined Patent Publication No. 66067/1984).

FIG. 13 of the accompanying drawing shows a cross-sectional view of a typical structure of the "rib-separator type" fuel cell. The fuel cell is constructed with an electrolyte layer 1 to hold therein an electrolyte; a fuel electrode 2 which is made up of an electrode base material 3 and a reaction (catalyst) layer 4; an oxidizer electrode 5 which is made up of an electrode base material 6 and a reaction (catalyst) layer 7; gas separation plates 10 (also called separators, or bi-polar plates, or interconnectors); oxidizer gas flow passages 11, and fuel gas flow passages 12. The cell is called "rib-separator type", because these gas flow passages 11 and 12 are formed in the gas separator plate 10. In another way, a structure, in which the gas flow passages are formed in the electrodes, is also feasible.

In the following, the electrochemical reaction in the fuel cell will be explained. In the reaction (catalyst) layer 4 of the fuel electrode 2, hydrogen as fed through the reaction gas flow passages 12 discharges the electrons to be turned into the hydrogen ions, as follows.

$$H_2 \rightarrow 2H^+ + 2e^-$$

The hydrogen ions move in and through the electrolyte held in the electrolyte layer 1 towards the reaction (catalyst) layer 7 of the oxidizer electrode 5. In the reaction (catalyst) layer 7 of the oxidizer electrode 5, the hydrogen ions, the electrons which have been produced in the reaction (catalyst) layer 4 of the fuel electrode 2 and have flown through an external circuit, and oxygen which has been fed through the reaction gas flow passages 11 are reacted to produce water, as follows.

$$1/2 O_2 + 2H^+ + 2e^- \rightarrow H_2O$$

As a whole, these two reactions can be expressed in the following manner, whereby electric generation is effected in the form of electrons flowing through the external circuit.

$$H_2 + 1/2 O_2 \rightarrow H_2O$$

In such fuel cell, the reaction (catalyst) layer has the same area as that of a single battery surface. As the consequence of this, it was not possible to increase an output density of the fuel cell per unit area.

In this connection, the inventors of the present application previously proposed to augment the reaction area by corrugating the surface of the reaction (catalyst) layer (vide: Japanese Unexamined Patent Publications No. 217955/1984, No. 29453/1988 and No. 29454/1988). FIG. 14 of the accompanying drawing shows a cross-sectional view of one example of such corrugated layer surface, by which the area of the reaction section has increased from $L_1$ to $L_2$.

On the other hand, in the fuel cell or the like, the reaction (catalyst) layer should have its tight gas-sealing property on its outer peripheral part, for the purpose of which the present inventors also proposed previously to improve such gas-sealing property of the fuel cell (vide: Japanese Unexamined Patent Publications No. 193065/1987, No. 16565/1988 and No. 181266/1988).

In the conventional electrochemical single battery as mentioned above, it is required that the electrode base material be provided in advance with such corrugation for the purpose of imparting such corrugated form to the reaction (catalyst) layer, which therefore inevitably complicated the cell structure, and necessitated precise machining only to increase its manufacturing cost, and other problems.

On the other hand, at the gas-sealed peripheral part, it is necessary to fill a sealing material in the electrode base material, or to arrange fresh sealing material within one and the same plane of the electrode, with the consequent problems such that the cell structure becomes complicated, stepped parts tend to occur in the cell structure, and so forth.

SUMMARY OF THE INVENTION

The present invention has been made with a view to solving such points of problems as mentioned above, and aims at providing an electrochemical single battery which has increased its output density per unit area, without making the battery construction complicated. Further, the present invention aims at providing a method for readily producing such single battery, with its improved gas-sealing property on the peripheral part of the electrodes.

According to the present invention, in one aspect of it, there is provided an electrochemical single battery, which comprises: a pair of electrode parts which are mutually opposed to be the electrodes when the electrochemical reaction is effected; reaction layers to carry out the electrochemical reaction, which are positioned between these two electrode parts, each being protruded alternately in one and the same direction from one electrode part toward the other electrode part in confrontation therewith, and being a slant with respect to the electrode parts; and an electrolyte therein an electrolyte which transmits ions to be produced at the time of the electrochemical reaction.

According to the present invention, in another aspect of it, there is provided a method for producing an electrochemical single battery, which comprises: a first step of forming, on both surfaces of a planar electrolyte layer sheet, reaction layer sheets of a size smaller than the electrolyte layer sheet in lamination, followed by shaping the laminated sheets into the form of bellows; and a second step of pressing the laminated sheets in the form of bellows from a slant direction with respect to the sheet surface.

The foregoing objects, other objects as well as specific construction of the electrochemical single battery according to the present invention and the method for its production will become more apparent and understandable from the following detailed description thereof, when read in conjunction with the accompanying drawing, in which the same reference numerals designate identical or equivalent parts.

DETAILED DESCRIPTION OF THE PREFERRED EMBODIMENTS

According to the present invention, the mutually confronted reaction layers in the protruded shape increase the effective area for the electrochemical reaction. Further, on the outer peripheral part thereof, there is formed a portion where no reaction layer is present.

Figure 1:
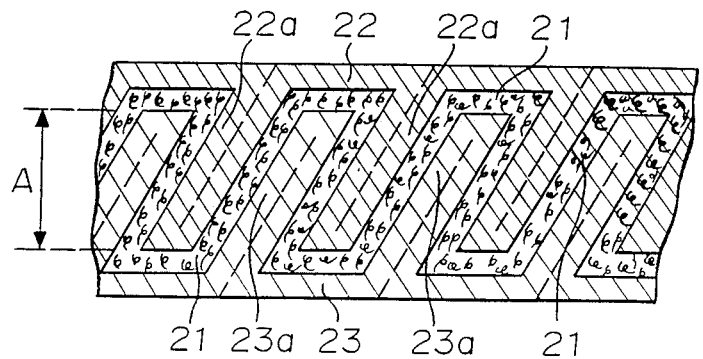
FIG. 1 is a cross-sectional view showing a part of the electrochemical single battery for a fuel cell according to one embodiment of the present invention.

Referring now to FIG. 1, showing a cross-section of the single battery for the fuel cell according to one embodiment of the present invention, a reference numeral 21 designates an electrolyte layer which is interposed between the reaction layers to bring about the electrochemical reaction, and in which an electrolyte to transmit ions to be produced at the time of the electrochemical reaction is retained; and a numeral 22 refers to a reaction (catalyst) layer to bring about the electrochemical reaction at the fuel electrode part; a reference numeral 22a denotes a protruded part of the reaction layer 22 which is protruded towards the oxidizer electrode part in a slanted relationship with respect to that electrode part; a numeral 23 refers to a reaction (catalyst) layer to bring about the electrochemical reaction at the oxidizer electrode part; and reference numeral 23a represents a protruded part of the reaction layer 23 which is protruded towards the fuel electrode part in a slanted relationship with respect to that electrode part. Each of these protruded parts 22a, 23a is protruded alternately in one and the same direction.

As it can be seen from the cross-sectional view of FIG. 1, in this electrochemical single battery of the present invention, the region A where the protruded parts 22a, 23a confront each other by way of the electrolyte layer 21 can be added to the reaction area, so that the effective reaction area per single battery becomes broader than that of the conventional single battery. For instance, in the case of the embodiment shown in FIG. 1, the effective reaction area can be increased more than three times as large as the conventional one, with the consequence that an output density per unit area would also increase.

Figure 2:
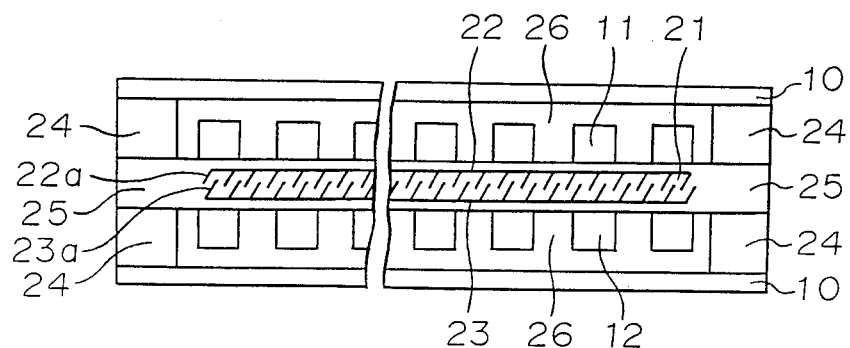
FIG. 2 is a cross-sectional view showing one embodiment, wherein the gas flow passages and the gas separating plate have been incorporated in the single battery of FIG. 1.
Figure 13:
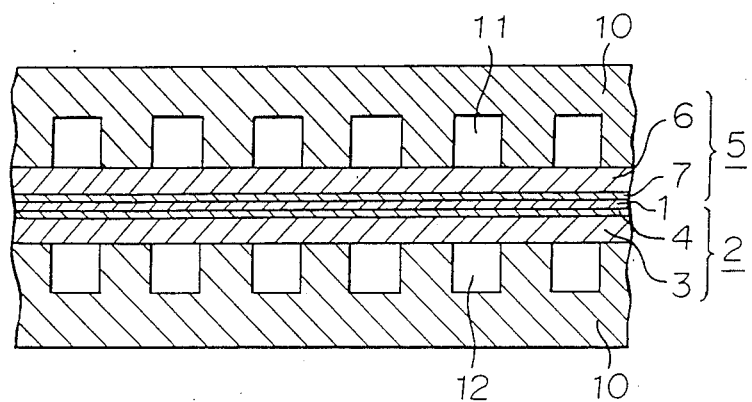
FIG. 13 and 14 are respectively cross-sectional views showing the typical construction of a conventional electrochemical single battery.
Figure 14:
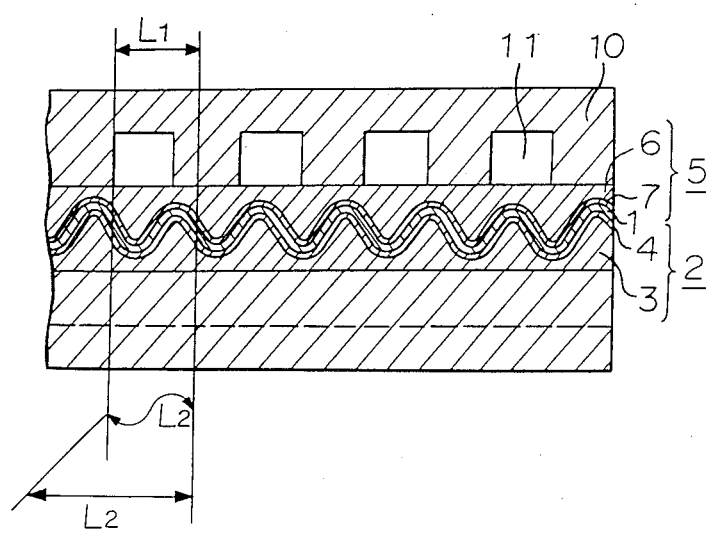

FIG. 2 is also a cross-sectional view showing one embodiment, wherein the gas flow passages and the gas separating plate are incorporated in the single battery shown in FIG. 1. In this battery construction, a reference numeral 24 designates hard rails provided at both ends of electrode; a reference numeral 25 denotes the gas-sealing part provided at both ends of the electrolyte layer; and a numeral 26 refers to a porous member which corresponds to the electrode base material. Reference numerals 10, 11 and 12 designate the same component members as those of the conventional single battery shown in FIGS. 13 and 14.

Since the electrolyte layer 21 and the reaction (catalyst) layers 22, 23 are integrally formed in the above-mentioned single battery, the wall thickness thereof can be made several times as thick as the conventional one, hence a very tough film layer can be obtained. As the consequence, the electrode base materials 3, 6 which have so far been used for supporting the reaction (catalyst) layers 4, 7 can be reduced in their thickness or be eliminated entirely. Therefore, if and when the increased thickness of the single battery is able to compensate, the reduced amount of the electrode base materials 3, 6, the thickness of the single battery per one cell remains to be substantially same as that of the conventional single battery.

It goes without saying that the same electrode base materials as in the conventional single battery may be used, and that such reduced amount of the electrode base material may also be applied to the rib-electrode type or rib-separator type single battery.

In the following, the method for producing the electrochemical single battery according to one embodiment of the present invention will be explained.

Figure 3:
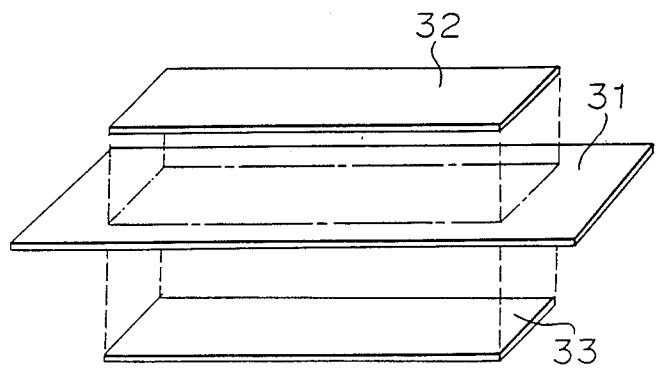
FIG. 3 to 12 are explanatory diagrams of one embodiment of the process steps to carry out the method for producing the electrochemical single battery according to the present invention.
Figure 4:
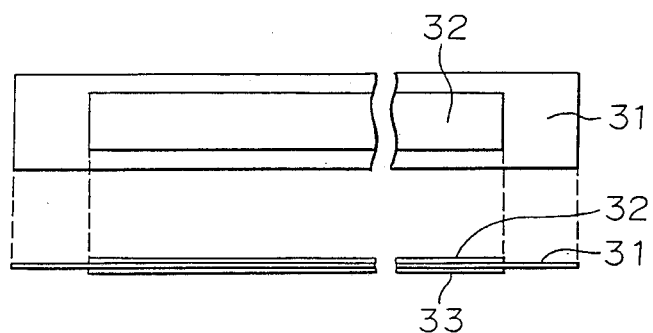
Figure 5:
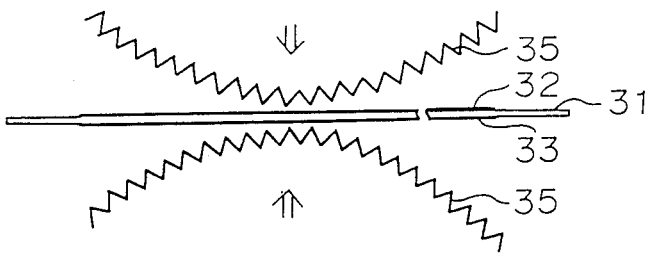
Figure 6:
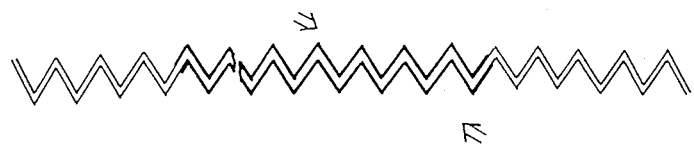

Referring to FIGS. 3 to 6 which are respectively explanatory diagrams for one example of the first process step of its production, there is laminated, on both surfaces of a planar electrolyte layer sheet 31, reaction (catalyst) layer sheets 32, 33 having a smaller size than the electrolyte layer sheet 31 (vide: FIGS. 3 and 4). FIG. 5 is a schematic diagram for explaining a process step of forming bellow-shaped corrugations on the laminated sheets shown in FIG. 4, in which a reference numeral 35 designates a molding plate for making such bellow-shaped corrugations. In more detail, a pair of molding plates 35, 35 are applied on both surface of the laminated sheets, followed by sequential pressing of the molding plates onto the laminated sheets, starting from the vicinity of the center part of the lamination, or from either end thereof, whereby the laminated sheet in the form of the bellows, as shown in FIG. 6, can be obtained.

Figure 7:
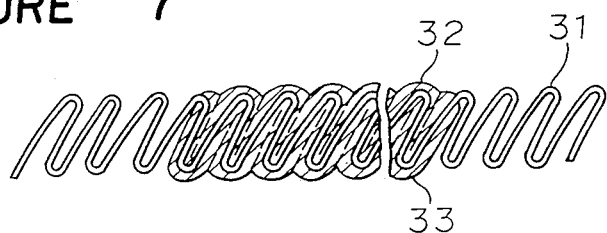
Figure 8:
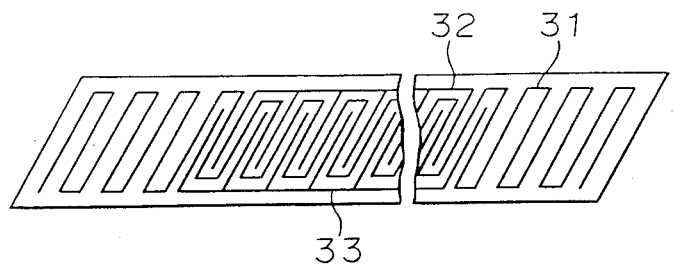
Figure 9:
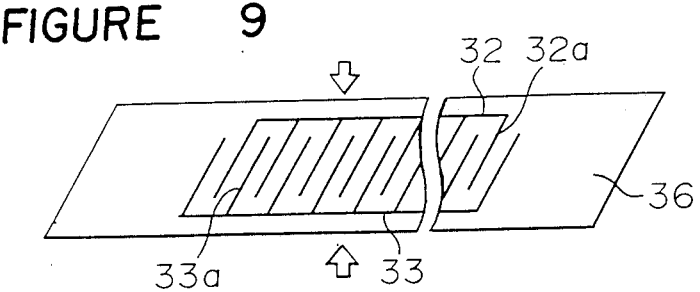
Figure 10:
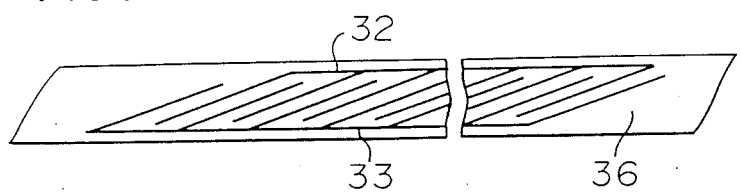

FIG. 7 is an explanatory diagram for one example of the second process step of its production, which shows a state of the laminated sheet shaped in bellows having been compressed from a slant direction with respect to the sheet surface. FIG. 8 illustrates this state diagrammatically. FIG. 9 is a simplified form of illustration where the laminated sheets are compressed in a slanted direction. If it is desired that this laminated sheets be made much thinner, it may be compressed from both upper and lower directions, as shown in FIG. 10.

Figure 11:
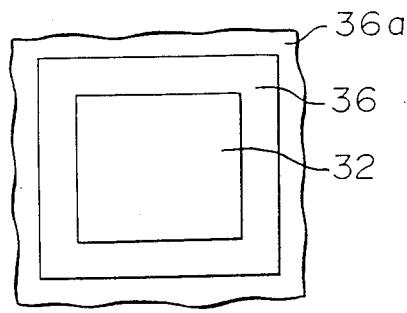
Figure 12:
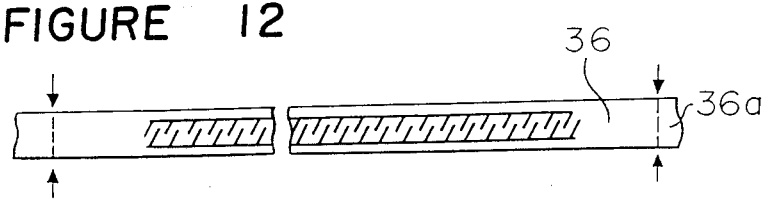

Through the above-mentioned process steps for its production, there can be obtained a single battery sheet as shown in FIGS. 11 and 12, which are respectively a plan view and a cross-sectional view thereof.

As mentioned in the preceding, by the method for production of the electrochemical single battery according to the present invention, it is possible to easily manufacture the single battery sheet. In addition, with the reaction (catalyst) layer sheet 32, 33 being made smaller in size than the electrolyte layer sheet 31, it is possible to form, on the outer peripheral part of the reaction (catalyst) layer sheet 31, the gas-sealing portion 36 formed as an integral part thereof. In this case, the surrounding excessive portion 36a of the sheet 31 can be cut away, as the case may be. When the thus produced single battery sheet is to be assembled with the electrodes for such single battery, there is no necessity for newly providing such gas-sealing portion. Furthermore, since the single battery is constructed with a single sheet, which is compressed uniformly in an integral whole, there is no possibility of a stepped part being formed in the single battery with the consequent advantage such that, when the single battery is to be stacked, its assembly can be considerably simplified, and short-circuiting between the stacked reaction (catalyst) layers 32, 33 can also be avoided.

In the following, explanations will be given as to one example of the electrolyte layer sheet and the reaction (catalyst) layer sheet for use in the phosphoric acid type fuel cell. For the electrolyte layer sheet 31, there may be employed a sheet formed of a kneaded mixture composed of 5 to 10% by weight of polytetrafluoroethylene (PTFE) resin and fine particles of silicon carbide, etc. Also, for the reaction (catalyst) layer sheet 32, 33, there may be employed a sheet formed of a kneaded mixture composed of 40 to 50% by weight of PTFE resin and fine particles of carbon which carries thereon platinum as a catalyst. These electrolyte layer sheet and reaction (catalyst) sheet are highly pliable, hence easy to be press-molded. By the way, since these sheets generally contain therein various organic substances such as dispersing agent, plasticizing agent, and so forth, these organic substances are required to be removed by decomposition or evaporation. In this case, heating of these sheets in a hot-press is considered suitable. This heating process may be incorporated in the process steps for producing the single battery sheet, or it may be set aside from the production steps. In the latter case, the single battery sheet, after it has been manufactured, may be heated in a batch furnace or a continuous furnace. In other way, these sheets may be washed with organic solvent.

In the case of the high molecular weight solid electrolyte type fuel cell, the electrolyte layer sheet that can be used is a proton-exchanged activated film as disclosed in Japanese Unexamined Domestic Patent Publication under PCT No. 500759/1987. The reaction (catalyst) layer is hot-pressed on both front and rear surface of this film, after which the combination of the reaction layer and the film is caused to pass through the production steps as illustrated in FIGS. 5 to 12, whereby the single battery sheet can be manufactured easily.

Even in the case of the molten carbonate type fuel cell and the solid electrolyte type fuel cell, with the electrolyte layer and the reaction (catalyst) layer being made of ceramic, etc. having less flexibility, such single battery sheet can also be produced easily by adding a plasticizer to these layers so as to give them sufficient flexibility for shaping, after which they are heated for calcination.

In the above described examples of the present invention, explanations have been given on the fuel cell as an example. It should, however, be noted that the invention is also applicable to other electrochemical elements such as, for example, electrolytic cells, ozone generators, cells for electrolytic soda, cells for various sensors, and others.

As so far been described in the foregoing, the electrochemical single battery according to the present invention is so constructed that it comprises a pair of electrode parts which are mutually opposed to be the electrodes when the electrochemical reaction is effected; reaction layers to carry out the electrochemical reaction, which are positioned between these two electrode parts, each being protruded alternately in one and the same direction from one electrode part toward the other electrode part in confrontation thereto, and being a slant with respect to the electrode part; and an electrolyte layer interposed between these confronted reaction layers and holding therein an electrolyte which transmits ions to be produced at the time of the electrochemical reaction.

As the consequence of this, it has advantages such that the resulted electrochemical single battery is of simple construction, and has an increased output density per unit area.

Further, the method for producing the electrochemical single battery according to the present invention is so constructed that it comprises a first step of forming, on both surfaces of a planar electrolyte layer sheet, reaction layer sheets of a size smaller than the electrolyte layer sheet in lamination, followed by shaping the laminated sheets into the form of bellows; and a second step of pressing the laminated sheets in the form of bellows from a slant direction with respect to the sheet surface. As the consequence of this, the production of the electrochemical single battery has its advantageous effects such that it can be easily manufactured, and that the gas-sealing property on the peripheral part of the electrode can be improved.

In the foregoing, the present invention has been described with specific details with reference to the preferred embodiments thereof. It should, however, be noted that the present invention is not limited to these embodiments alone, but any changes and modifications may be made by those persons skilled in the art without departing from the spirit and scope of the invention as recited in the appended claims.

What is claimed is:

1. An electrochemical single battery, which comprises:
   a pair of electrode parts which are mutually opposed to be the electrodes when the electrochemical reaction is effected;
   reaction layers to carry out said electrochemical reaction, which are positioned between said two electrode parts, each being protruded alternately in one and the same direction from one electrode part toward the other electrode part in confrontation thereto, and being a slant with respect to said electrode part; and an electrolyte layer interposed between said confronted reaction layers and holding therein an electrolyte which transmits ions to be produced at the time of said electrochemical reaction.

2. An electrochemical single battery according to claim 1, wherein said electrolyte layer is a sheet formed of a kneaded mixture composed of 5 to 10% by weight of polytetrafluoroethylene (PTFE) resin and fine particles of silicon carbide, and said reaction layer is a sheet formed of a kneaded mixture composed of 40 to 50% by weight of polytetrafluoroethylene resin and fine particles of carbon which carries thereon platinum as a catalyst.

3. A method for producing an electrochemical single battery, which comprises:

a first step of forming, on both surfaces of a planar electrolyte layer sheet, reaction sheets of a size smaller than said electrolyte layer sheet in lamination, followed by shaping the laminated sheets into the form of bellows; and a second step of pressing said laminatec sheets in the form of bellows from a slant direction with respect to the sheet surface.

* * * * *